United States Patent [19]
Nourrcier

[11] Patent Number: 5,262,836
[45] Date of Patent: Nov. 16, 1993

[54] COHERENT DOUBLE HOMODYNE OPTICAL BACKSCATTER FILTER

[75] Inventor: Charles E. Nourrcier, Lakewood, Calif.

[73] Assignee: Hughes Aircraft Company, Los Angeles, Calif.

[21] Appl. No.: 810,087

[22] Filed: Dec. 19, 1991

[51] Int. Cl.⁵ .............................. G01C 3/08
[52] U.S. Cl. ................................. 356/5
[58] Field of Search .............. 356/5, 4.5, 28.5; 342/128

[56] References Cited

U.S. PATENT DOCUMENTS

| | | |
|---|---|---|
| 4,516,583 | 5/1985 | Pearson ............................ 356/5 X |
| 4,537,502 | 8/1985 | Miller et al. ......................... 356/5 |
| 4,731,587 | 3/1988 | Jensen . |
| 5,070,483 | 12/1991 | Berni ............................ 356/28.5 X |
| 5,082,364 | 1/1992 | Russell ................................ 356/5 |

*Primary Examiner*—Mark Hellner
*Attorney, Agent, or Firm*—Michael W. Sales; Wanda K. Denson-Low

[57] ABSTRACT

An optical backscatter filter (10) for use with continuous wave laser radar systems. The filter removes undesired frequency components corresponding to optical backscatter from a received input signal (12) to extract a desired return signal (32) associated with a target. The received signal (32) is processed optically, requiring only an electronic notch filter (24) and one electronic mixer (30) to finally extract the desired return signal (32).

17 Claims, 1 Drawing Sheet

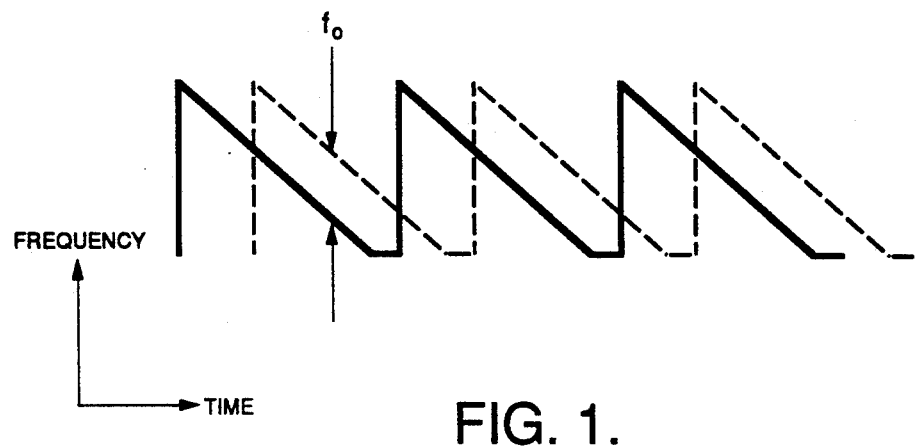
FIG. 1.
FIG. 2.
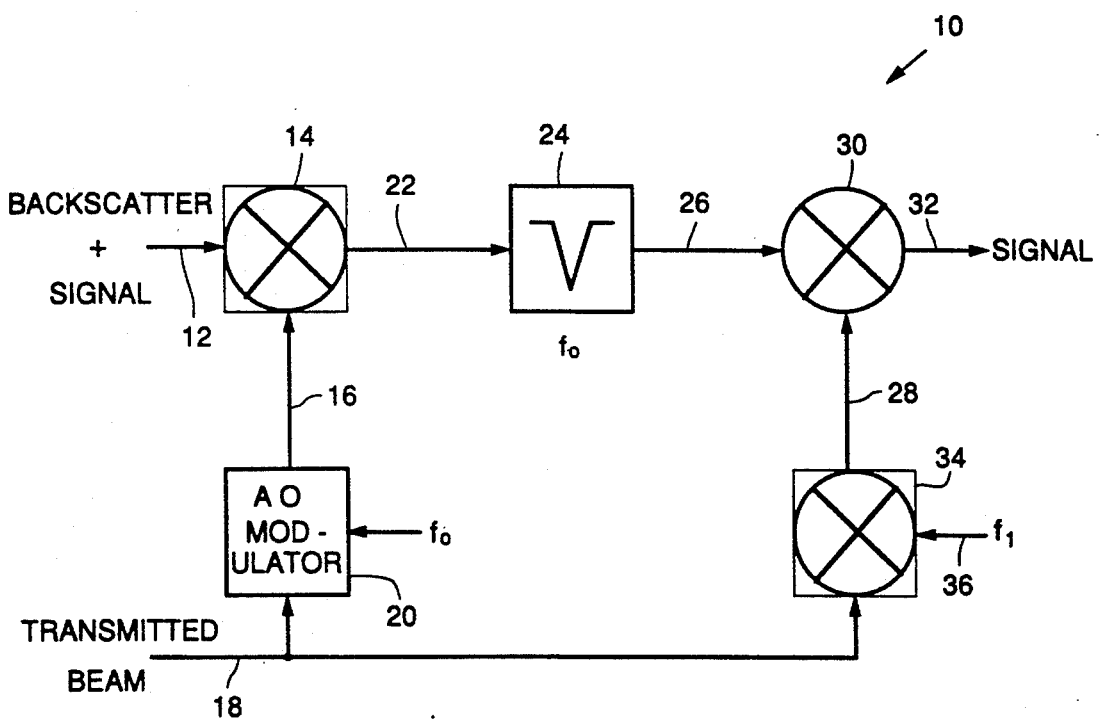

COHERENT DOUBLE HOMODYNE OPTICAL BACKSCATTER FILTER

BACKGROUND OF THE INVENTION

1. Field of the Invention

The present invention relates generally to laser radar and, more particularly, to an optical backscatter filter for use with continuous wave (CW) laser radar systems.

2. Discussion

Laser radar systems, employing an intensely focused beam of light to detect the presence, position and motion of objects, have been used in many applications, especially in the radar communications and measurement fields. Militarily, these systems have been implemented in conjunction with new cruise missile and tactical fighter technology wherein laser radar has provided obstacle avoidance as well as terrain following functions. Laser radar systems have also enabled sophisticated target homing capabilities for accurately guiding a missile or plane toward a target by using a distinguishing feature of that target.

FM "chirped" laser radar which involves heterodyne or coherent detection has proven to be particularly useful in these applications. Typically in these systems, a continuous wave (CW) transmitter emits laser light at a preselected center frequency. This emitted light is frequency modulated into linear "chirps" by passing it through an electro-optical device disposed within the cavity of the transmitter. The frequency variation created is preferably linear and the frequency versus time characteristic of the signal typically has a sawtooth trapezoid pattern.

The "chirped" signal is directed toward a target and then reflected back therefrom, creating a "return" signal associated with that target. The time taken by the transmitted signal to reach the target and then return causes the return signal to be displaced in time with respect to the transmitted signal. This is shown graphically in FIG. 1 wherein the solid line represents the transmitted signal and the dashed line shows a corresponding return signal.

The instantaneous frequency difference between these signals is indicated in FIG. 1 as $f_o$. To obtain this frequency difference, the return signal is compared to a reference signal which is typically a sample of the transmitted signal created by retaining a small portion of the transmitted beam using a beamsplitter. Properly scaled, this instantaneous frequency difference can be used to "demodulate" the return signal in order to obtain information about the target.

In practice, however, especially in monostatic or common aperture laser radar systems, the transmitted signal travels through the same optics as does the return signal. Due to imperfections in the optics, part of the transmitted signal is reflected by the optics back toward the receiving photodetector as "optical backscatter". Therefore, the received signal incident on the photodetector includes not only the return signal but also interfering transmitted light or optical backscatter. This backscatter in a monostatic or common aperture laser radar system can typically be five to eight orders of magnitude greater than the energy reflected from the radar target, thereby severely reducing the dynamic range and performance in the receiving electronics as well as producing interfering harmonics in the receiver. This optical backscatter signal is a severe problem in modulated CW laser systems wherein the receiver and transmitter are required to operate simultaneously.

However, it is possible to discriminate between the return signal and the interfering backscatter by using the frequency and time characteristics of these signals. The backscattered optical energy, being transmitted light, is substantially frequency coherent with the reference signal whereas the frequency of the return signal is displaced in time. By removing components of the received signal that are frequency coherent with the transmitted signal, i.e., the backscatter, the desired return signal can be extracted.

Conventionally, electronic backscatter filters have been employed to remove this interference from the desired return signal. The return signal and backscatter are typically electronically mixed with an electronically frequency shifted transmitted reference signal. This process usually involves very wideband signals and the electronic mixing process generates spurious backscatter signals that compete in signal strength with the return signal by generating ghost targets. These ghost targets are backscatter signals which have been generated by the electronic mixing process and which are no longer at the same frequency as the optical backscatter signal that is processed through the electronic mixer. Therefore, these ghost targets can not be eliminated by the backscatter filter because they can no longer be discriminated from real return signals.

In addition, chirp nonlinearites often result from the traditional electronic mixing process. These nonlinearites limit the amount of backscatter that can be processed as well as the bandwidth-time capability of the system. The electronic optical backscatter filter has often been labelled as a severe limitation to the produceability of FM laser radar.

For these reasons, as well as the need for unerring resolution and accuracy in critical military applications, there exists a need for an optical backscatter filter which is accurate, efficient, and reliable. Also, due to the nature of these applications wherein multiple laser radar systems requiring multiple backscatter filters are employed on one missile or plane, it is desirable that such filters be compact, simple, and less expensive than previous systems.

SUMMARY OF THE INVENTION

The optical backscatter filter of the present invention removes undesired frequency components corresponding to optical backscatter from a received signal by optically comparing the received signal to a reference signal. The reference signal is a sample of the transmitted signal which has been offset in frequency by a device such as an Acousto-optical modulator. The undesired frequency components, those of the offset frequency, are filtered out and the resulting signal is mixed with another reference signal to coherently reassemble the desired return signal.

BRIEF DESCRIPTION OF THE DRAWINGS

FIG. 1 is a graph showing the frequency versus time characteristics of a transmitted signal (solid line) and a corresponding desired return (dashed line) signal.

FIG. 2 is a schematic diagram of the backscatter filter of the present invention.

DESCRIPTION OF THE PREFERRED EMBODIMENT

Referring now to the drawings, an optical backscatter filter in accordance with the teachings of the present invention is indicated generally at 10. Received optical signal 12, the input to backscatter filter 10, consists of both a desired return signal (or that reflected from the target) as well as optical backscatter. The received signal 12 is mixed at optical square law photomixer 14 with an optical reference signal 16. This reference signal 16 is a sample of the transmitted signal that has preferably been offset in frequency by a known amount $f_o$. The sample may be obtained by splitting off and retaining a small portion of the transmitted beam using a beamsplitter.

The offset frequency $f_o$ is preferably chosen to keep all important mixing products of photomixer 14 away from 0 Hz or DC, preferably at least as great as 150 Hz. If there were no frequency offset, the difference between the desired return signal and the reference signal 16 would result in both positive and negative frequencies. Since the negative frequencies fold on top of the positive frequencies and there is no easy way of discriminating between them, an offset frequency is added to preserve these higher and lower frequency relations. This offset frequency is preferably added to a sample of the transmitted beam 18 by an Acousto-optical (AO) modulator 20 which creates an acoustic wavefront to shift the frequency of optical light. An example of a typical AO modulator is the Newport EOS part number AOM37150-.5.

The photomixer 14 multiplies the offset reference signal 16 by the received signal 12 to produce an electric signal 22 at its output whose frequency is the instantaneous frequency difference between the two signals. If the instantaneous frequencies of these signals are frequency coherent, then it is clear that the frequency difference between them is the offset frequency. The electronic signal 22 output from mixer 14 is then passed through an electronic notch filter 24 which rejects the offset frequency, thereby eliminating all components of the unwanted, or frequency coherent, backscatter signal.

If, however, the time delay between the transmitted and returned signals is such that the return signal is substantially frequency coherent with the reference signal, it will appear to filter 10 to be backscatter and will be eliminated by notch filter 24. This is known as the blind range associated with laser radar. Although this problem can be dealt with by knowing some preliminary information about the range of the target, minimizing the bandwidth of notch filter 24 minimizes this blind range. This, however, requires maximum coherence between the transmitted signal and the optical backscatter, an area where the filter 10 of the present invention excels over more traditional electronic backscatter filters as such electronic filters have an inband dispersion problem which makes such coherence more difficult to attain.

While the frequency components associated with the optical backscatter have been substantially eliminated from the filtered signal 26, the phase reference of the desired return signal has been lost in the backscatter filtering process. By mixing filtered signal 26 with a second reference signal 28 in electronic mixer 30, the desired return signal 32 having the phase relationship of the originally received signal is recovered. The second reference signal 28 is created by mixing in photomixer 34 a sample of the transmitted beam 18 and a local oscillator (LO) signal 36. This LO signal 36 is created by a CW laser beam having a center frequency offset from DC, preferably by about 225 MHz. The reference signal 28 and filtered signal 26 can, therefore, be reassembled coherently in order to utilize all of the signal energy and range resolution.

The optical backscatter filter 10 thereby reduces the magnitude of the interfering electronic signal caused by optical backscatter without affecting the target return signal or generating spurious harmonics, especially when the target is at a short range. The AO modulator generates only a single, low level spurious signal and this spurious signal is out of band.

By replacing the critical electronic mixer with an Acousto-optic modulator and processing the backscatter optically, requiring only an electronic notch filter to finally remove the unwanted interference, some of the problems associated with electronic backscatter filters are eliminated and the overall complexity of FM laser radar systems is reduced. A higher bandwidth-time capability, providing for greater resolution and accuracy as well as longer range capability, is also now realizable due to the elimination of some of the more difficult electronic filters. A backscatter rejection capability of up to 80 db has been achieved, limited in this case to the dynamic range of the optical photomixer.

While the invention has been described in connection with the presently preferred embodiment, one skilled in the art will readily recognize that various changes and modifications can be made thereto without departing from the spirit and scope of the invention as set forth in the appended claims.

What is claimed is:

1. A filter for removing optical backscatter from a received signal in a continuous wave laser radar system, said filter removing an undesired optical frequency component from said received signal having a desired optical frequency component, said filter comprising:
   means for adding an offset frequency to an optical reference signal wherein said optical reference signal is a sample of a transmitted signal in said laser radar system;
   means for subtracting said received signal from said offset reference signal to generate a first difference signal;
   means for filtering frequency components or said offset frequency from said first difference signal to generate a filtered received signal; and
   means for combining said filter received signal with second reference signal to obtain said desired optical frequency component.

2. The filter of claim 1 wherein said means for adding an offset frequency is an acousto-optic modulator.

3. The filter of claim 1 wherein said means for filtering is a notch filter having a center frequency substantially equal to said offset frequency.

4. The filter of claim 1 wherein said means for subtracting is an optical square law photomixer.

5. The filter of claim 4 wherein said offset frequency is chosen so as to keep the difference signal generated by said photomixer substantially above 150 MHz.

6. The filter of claim 1 wherein said second reference signal is a sample of a transmitted signal in said laser radar system which has been mixed with a local oscillator signal, said local oscillator signal being offset in frequency substantially by 225 MHz.

7. The filter of claim 1 wherein said means for combining is an electronic mixer.

8. A filter for removing optical backscatter from a received signal in a continuous wave laser radar system, said filter removing an undesired optical frequency component from said received signal having a desired frequency component, said filter comprising:
   an acousto-optic modulator for adding an offset frequency to an optical reference signal;
   an optical square law mixer for subtracting said received signal from said offset reference signal to generate a first difference signal, said offset frequency chosen so as to keep said difference signal substantially above 150 MHz;
   a notch filter having a center frequency substantially equal to said offset frequency for filtering frequency components of said offset frequency from said first difference signal to generate a filter received signal; and
   an electronic mixer for combining said filtered received signal with a second reference signal to obtain said desired optical frequency component, said second reference signal being a sample of a transmitted signal in said laser radar system which has been mixed with a local oscillator signal, said local oscillator signal being offset in frequency substantially by 225 MHz.

9. A method for removing optical backscatter from a received signal in a continuous wave laser radar system comprising the steps of:
   sampling a transmitted signal in said laser radar system to provide an optical reference signal;
   adding an offset frequency to the optical reference signal;
   subtracting said received signal from said offset reference signal to generate a first difference signal;
   filtering frequency components of said offset frequency from said first difference signal to generate a filtered received signal; and
   combining said filtered received signal with a second reference signal to obtain said desired optical frequency component.

10. The method of claim 9 wherein said offset frequency is added to said reference signal with an acousto-optic modulator.

11. The method of claim 9 wherein said received signal is subtracted from said offset reference signal by passing said received and reference signals through an optical square law photomixer.

12. The method of claim 11 wherein said offset frequency is chosen so as to keep the difference signal generated by said photomixer substantially above 150 MHz.

13. The method of claim 9 wherein said frequency components at offset frequency are filtered from said first difference signal with a notch filter having a center frequency substantially equal to said offset frequency.

14. The method of claim 9 wherein an electronic mixer is used to combine said filtered signal with said second reference signal.

15. The method of claim 9 wherein said second reference signal is a sample of a transmitted signal in said laser radar system which has been mixed with a local oscillator signal, said local oscillator signal being offset in frequency substantially by 225 MHz.

16. A method for removing optical backscatter from a received signal in a continuous wave laser radar comprising the steps of:
   adding an offset frequency to an optical reference signal in said laser radar system and being passed through an acousto-optic modulator to offset said signal by substantially 150 MHz;
   subtracting said received signal from said offset reference signal in a square law photomixer to generate a first difference signal;
   filtering said first difference signal through a notch filter having a center frequency substantially equal to said offset frequency to generate a filtered received signal;
   combining said filtered received signal with a second reference signal in an electronic mixer to obtain said desired optical frequency component, said second reference signal being a sample of a transmitted signal in said laser radar system which has been mixed with a local oscillator signal, said local oscillator signal being offset in frequency substantially by 225 MHz.

17. A continuous wave laser radar system, said system comprising:
   means for receiving a received radar signal, the received signal including optical backscatter of a transmitted signal and a radar return signal;
   means for adding an offset frequency to a sample of said transmitted signal to provide an optical reference signal;
   means for subtracting said received signal from said offset reference signal to generate a first difference signal;
   means for filtering frequency components of said optical frequency from said first difference signal to generate a filtered received signal; and
   means for combining said filtered received signal with a second reference signal to obtain said radar return signal.

* * * * *